(12) United States Patent
Li et al.

(10) Patent No.: US 11,616,990 B2
(45) Date of Patent: Mar. 28, 2023

(54) METHOD FOR CONTROLLING DELIVERY OF A VIDEO STREAM OF A LIVE-STREAM ROOM, AND CORRESPONDING SERVER AND MOBILE TERMINAL

(71) Applicant: GUANGZHOU BAIGUOYUAN INFORMATION TECHNOLOGY CO., LTD., Guangzhou (CN)

(72) Inventors: Xueling Li, Guangzhou (CN); Jianqiang Hu, Guangzhou (CN); Jianhong Chen, Guangzhou (CN); Chen Wu, Guangzhou (CN)

(73) Assignee: GUANGZHOU BAIGUOYUAN INFORMATION TECHNOLOGY CO., LTD., Guangzhou (CN)

( * ) Notice: Subject to any disclaimer, the term of this patent is extended or adjusted under 35 U.S.C. 154(b) by 246 days.

(21) Appl. No.: 16/463,065

(22) PCT Filed: Nov. 22, 2016

(86) PCT No.: PCT/CN2016/106755
§ 371 (c)(1),
(2) Date: May 22, 2019

(87) PCT Pub. No.: WO2018/094556
PCT Pub. Date: May 31, 2018

(65) Prior Publication Data
US 2019/0281327 A1    Sep. 12, 2019

(51) Int. Cl.
*H04N 21/2187*    (2011.01)
*H04N 21/239*    (2011.01)
(Continued)

(52) U.S. Cl.
CPC ..... *H04N 21/2187* (2013.01); *H04L 63/0815* (2013.01); *H04N 21/2393* (2013.01);
(Continued)

(58) Field of Classification Search
CPC ........... H04N 21/2187; H04N 21/2393; H04N 21/41407; H04N 21/4223;
(Continued)

(56) References Cited

U.S. PATENT DOCUMENTS

| 5,617,539 A * | 4/1997 | Ludwig .................. G06Q 10/10 348/14.03 |
| 9,891,803 B2 * | 2/2018 | Scott ...................... H04L 67/02 |

(Continued)

FOREIGN PATENT DOCUMENTS

| CN | 1696923 A | 11/2005 |
| CN | 102780916 A | 11/2012 |

(Continued)

OTHER PUBLICATIONS

International Search Report and Written Opinion Form PCT/ISA220 and PCT/ISA 237, International Application PCT/CN2016/106755, pp. 1-6, International Filing Date Nov. 22, 2016, dated Aug. 2, 2017.

(Continued)

*Primary Examiner* — Nasser M Goodarzi
*Assistant Examiner* — Patrick A Ryan
(74) *Attorney, Agent, or Firm* — George McGuire

(57) ABSTRACT

Provided is a method for controlling delivery of a video stream of a live-stream room, and corresponding server and mobile terminal. The method includes steps of: receiving a connection request initiated by an anchor user of the live-stream room from a first terminal and including pre-protocol information outputted by a second terminal; sending, in response to the connection request, a first live video stream uploaded by the first terminal down to the second terminal; and receiving a third live video stream uploaded by the second terminal and formed by combining at least one of a second live video stream and the first live video stream, and (Continued)

delivering the third live video stream to a member user in the live-stream room.

13 Claims, 5 Drawing Sheets

(51) Int. Cl.
　　*H04N 21/2743* (2011.01)
　　*H04N 21/414* (2011.01)
　　*H04N 21/4223* (2011.01)
　　*H04N 21/472* (2011.01)
　　*H04N 21/488* (2011.01)
　　*H04N 21/258* (2011.01)
　　*H04N 21/658* (2011.01)
　　*H04L 9/40* (2022.01)
　　*H04N 21/643* (2011.01)
　　*H04N 21/41* (2011.01)
　　*H04N 21/254* (2011.01)

(52) U.S. Cl.
　　CPC ... *H04N 21/2541* (2013.01); *H04N 21/25875* (2013.01); *H04N 21/2743* (2013.01); *H04N 21/4126* (2013.01); *H04N 21/41407* (2013.01); *H04N 21/4223* (2013.01); *H04N 21/47202* (2013.01); *H04N 21/4884* (2013.01); *H04N 21/643* (2013.01); *H04N 21/658* (2013.01)

(58) Field of Classification Search
　　CPC ......... H04N 21/47202; H04N 21/2743; H04N 21/658; H04N 21/4884; H04N 21/2541; H04N 21/4126; H04N 21/25875; H04N 21/643
　　See application file for complete search history.

(56) References Cited

U.S. PATENT DOCUMENTS

| | | | | | |
|---|---|---|---|---|---|
| 9,973,819 | B1* | 5/2018 | Taylor | ............... | H04N 7/17318 |
| 10,021,458 | B1* | 7/2018 | Taylor | ............... | H04N 21/2187 |
| 10,291,597 | B2* | 5/2019 | Li | ............... | H04L 63/10 |
| 10,404,481 | B2* | 9/2019 | Reddy | ............... | H04L 12/1822 |
| 10,440,436 | B1* | 10/2019 | Taylor | ............ | H04N 21/234345 |
| 10,516,707 | B2* | 12/2019 | Griffin | ............... | H04L 12/1818 |
| 2007/0157281 | A1* | 7/2007 | Ellis | ............... | H04N 21/6582 725/74 |
| 2008/0092047 | A1* | 4/2008 | Fealkoff | ............... | G11B 27/11 715/716 |
| 2011/0078717 | A1* | 3/2011 | Drummond | ........ | H04N 21/4821 715/764 |
| 2013/0212286 | A1* | 8/2013 | Krishnakumar | .. | H04L 29/06319 709/227 |
| 2013/0307920 | A1 | 11/2013 | Cahill et al. | | |
| 2014/0007211 | A1* | 1/2014 | Yang | ............... | H04L 63/18 726/7 |
| 2014/0122884 | A1* | 5/2014 | Pieczul | ............... | H04W 12/06 713/171 |
| 2014/0313282 | A1* | 10/2014 | Ma | ............... | H04N 7/141 348/14.09 |
| 2015/0110471 | A1* | 4/2015 | Zheng | ............... | H04N 1/00336 386/291 |
| 2016/0050160 | A1* | 2/2016 | Li | ............... | H04L 65/4038 713/176 |
| 2016/0057391 | A1* | 2/2016 | Block | ............... | H04N 7/152 348/14.07 |
| 2016/0142765 | A1* | 5/2016 | Ogle | ............... | H04N 21/42202 725/38 |
| 2016/0219319 | A1* | 7/2016 | Servignat | ............... | H04N 21/422 |
| 2016/0381427 | A1* | 12/2016 | Taylor | ............... | H04N 21/23424 725/13 |
| 2017/0006322 | A1* | 1/2017 | Dury | ............... | A63F 13/49 |
| 2019/0158889 | A1* | 5/2019 | Xue | ............... | H04N 21/643 |
| 2020/0021892 | A1* | 1/2020 | April | ............... | H04L 65/4076 |
| 2020/0394012 | A1* | 12/2020 | Wright, Jr. | ............ | G06K 9/6201 |

FOREIGN PATENT DOCUMENTS

| | | |
|---|---|---|
| CN | 104995924 A | 10/2015 |
| CN | 105306468 A | 2/2016 |
| CN | 105407384 A | 3/2016 |
| CN | 106028137 A | 10/2016 |
| CN | 106101753 A | 11/2016 |
| JP | 2016052368 A | 4/2016 |
| WO | 2015027849 A1 | 3/2015 |
| WO | 2016150317 A1 | 9/2016 |

OTHER PUBLICATIONS

Japanese Office Action, pp. 1-2.
India Office Action dated Jul. 12, 2020, pp. 1-6.
European Search Report of PCT/CN2016/106755, dated Mar. 24, 2020.

* cited by examiner

METHOD FOR CONTROLLING DELIVERY OF A VIDEO STREAM OF A LIVE-STREAM ROOM, AND CORRESPONDING SERVER AND MOBILE TERMINAL

CROSS-REFERENCE TO RELATED APPLICATIONS

This is a National Stage Application, filed under 35 U.S.C. 371, of International Patent Application No. PCT/CN2016/106755, filed on Nov. 22, 2016, the entire contents of which are incorporated herein by reference in their entirety.

TECHNICAL FIELD

The present disclosure relates to the field of a network live-streaming technology and, in particular, to a method for controlling delivery of a video stream of a live-stream room, and corresponding server and mobile terminal.

BACKGROUND

With the development of Internet technologies and intelligent mobile terminal devices, various Internet products bring great convenience and entertainment to people's work and life. In recent years, various kinds of live-stream platforms for video live-streaming have emerged in endlessly. Video live-streaming brings more real-time social experience to people. The current live-stream platform includes a live-stream platform for the mobile terminal and a live-stream platform for the personal computer (PC) terminal.

Due to the diversity of requirements of video live-streaming, an anchor needs to simultaneously live-stream the content on the PC (such as a game picture on the PC) and the personal image of the anchor user to better interact with the viewing users. This manner of live-streaming is called multi-view synchronous live-streaming or multi-platform synchronous live-streaming. The current multi-view synchronous live-streaming adopts the following schemes.

1. A separate PC client and a third-party peripheral camera are used for live-streaming.

For this scheme, complete client software for the PC terminal needs to be separately developed and cooperate with a third-party external camera. After the process window that needs to be live-streamed is manually combined with the camera, the live stream is uploaded to the server through the live-stream client and then delivered by the server to each viewing terminal. The operation and setting process is complicated. Moreover, the simultaneous live-streaming of the personal image and the process window can only be achieved on the premise of the installation and use of third-party peripherals and the addition of third-party video software.

2. The WEB end, the third-party live-stream stream delivery software and the peripheral camera are used for live-streaming.

A general WEB live-stream platform uses the WEB-end background and the third-party live-streaming stream delivery software for live-streaming. After the user registers an account on the WEB-end live-streaming platform and obtains the live-streaming permission of the WEB end through a process, speed of the personal network needs to be measured, and the third-party live-stream stream delivery software needs to be configured according to the specified code rate. Not only the process is complicated, but also various settings of the third-party live-stream stream delivery software needs to be mastered, and manual speed measurement and configuration are also needed, which is inconvenient for multi-platform live-streaming.

3. The mobile terminal is used in a manual manner for cross-platform live-streaming.

In the process of performing live-streaming on the mobile terminal, if the content on the PC terminal needs to be live-streamed, the user may adjust the direction and position of the camera of the mobile terminal to perform multi-view live-streaming in the form of manual live-streaming. The operation is relatively simple, while low quality of the live-streaming is resulted in because the range and the content of live-streaming are difficult to be guaranteed. At the same time, the mobile terminal's camera live-streams the content of other platforms, affecting the operation and the interaction of the user with the viewers during the process of live-streaming, and affecting greatly the interactive effect during the process of live-streaming.

In summary, for the multi-view and cross-platform live-streaming method which is currently supported, the operation process is cumbersome or the live-stream effect is not good enough, which cannot achieve the effect that the anchor user quickly share the live-stream content of multi-ends and provide better experience of the live content and interaction.

SUMMARY

The primary purpose of the present disclosure is to provide a method for controlling delivery of a video stream of a live-stream room and a server for executing steps of the method.

Another purpose of the present disclosure is to provide a method for controlling delivery of a video stream of a live-stream room and a mobile terminal for executing steps of the method.

In a first aspect, the present disclosure provides the method for controlling delivery of a video stream of a live-stream room. The method is executed by the server and includes the steps described below.

A server receives a connection request initiated by an anchor user of the live-stream room from a first terminal and including pre-protocol information outputted by a second terminal.

The server sends, in response to the connection request, a first live video stream uploaded by the first terminal down to the second terminal.

The server receives a third live video stream uploaded by the second terminal and formed by combining at least one of a second live video stream and the first live video stream, and delivers the third live video stream to a member user in the live-stream room.

Specifically, the server responds to the connection request, sends a unique device identifier of the first terminal, identity information of the anchor user, and characteristic information of the live-stream room to the second terminal according to the pre-protocol information, so that the first live video stream uploaded by the first terminal is sent down to the second terminal.

Further, after sending, in response to the connection request, the first live video stream uploaded by the first terminal down to the second terminal, and before receiving the third live video stream uploaded by the second terminal and formed by combining at least one of the second live video stream and the first live video stream and delivering the third live video stream to the member user in the live-stream room, the method further includes the step described below.

The server sends a control instruction for collecting the second live video stream to the second terminal to generate, on a user interface of the second terminal, a control window for collecting the second live video stream.

Specifically, the first live video stream, the second live video stream, and the third live video stream each include an image stream and an audio stream, and the third live video stream includes at least one of the image stream of the first live video stream and the image stream of the second live video stream and further includes at least one of the audio stream of the first live video stream and the audio stream of the second live video stream.

In a second aspect, the present disclosure further provides a method for controlling delivery of a video stream of a live-stream room. The method is executed by a first terminal and includes the steps described below.

A first terminal obtains pre-protocol information outputted by a second terminal, and initiates, with an anchor user identity, a connection request including the pre-protocol information to a server.

The first terminal uploads, in response to a confirmation instruction of an anchor user, a first live video stream generated in the first terminal to the server.

Specifically, the pre-protocol information is represented in a form of a quick response (QR) code, and is obtained by the first terminal through scanning the QR code with a camera.

In an embodiment, after initiating, with the anchor user identity, the connection request to the server, and before responding to the confirmation instruction of the anchor user, the first terminal provides an operation interface for confirming a connection to upload the first live video stream generated in the first terminal to the server after receiving the confirmation instruction of the anchor user.

Further, the method further includes a subsequent step.

The first terminal sends a control instruction for collecting a second live video stream through the server to the second terminal to generate, on a user interface of the second terminal, a control window for collecting the second live video stream.

In a third aspect, the present disclosure further provides a method for controlling delivery of a video stream of a live-stream room. The method is executed by a second terminal and includes the steps described below.

A second terminal outputs a link identifier representing pre-protocol information.

The second terminal receives a first live video stream down sent by a server in response to a connection request initiated by a first terminal to the server and including the pre-protocol information.

The second terminal collects a second live video stream in the second terminal, combines at least one of the first live video stream and the second live video stream into a third live video stream, and uploads the third live video stream to the server so that the server delivers the third live video stream to at least one user in a live-stream room.

Specifically, the pre-protocol information includes a unique device identifier of the second terminal.

In an embodiment, processes of the second terminal receiving the first live video stream, collecting the second live video stream, combining at least one of the first live video stream and the second live video stream into the third live video stream, and uploading the third live video stream are performed in parallel.

Additionally, corresponding to the first aspect, the present disclosure further provides a server configured to execute the steps described below.

The server receives a connection request initiated by an anchor user of a live-stream room from a first terminal and including pre-protocol information outputted by a second terminal.

The server sends, in response to the connection request, a first live video stream uploaded by the first terminal down to the second terminal.

The server receives a third live video stream uploaded by the second terminal and formed by combining at least one of a second live video stream and the first live video stream and delivers the third live video stream to a member user in the live-stream room.

Additionally, corresponding to the second aspect, the present disclosure further provides a mobile terminal configured to execute the steps described below.

The mobile terminal obtains pre-protocol information outputted by a second terminal, and initiates, with an anchor user identity, a connection request including the pre-protocol information to a server.

The mobile terminal uploads, in response to a confirmation instruction of an anchor user, a first live video stream generated in the mobile terminal to the server.

Additionally, corresponding to the third aspect, the present disclosure further provides a mobile terminal configured to execute the steps described below.

The mobile terminal outputs a link identifier representing pre-protocol information.

The mobile terminal receives a first live video stream down sent by a server in response to a connection request initiated by a first terminal to the server and including the pre-protocol information.

The mobile terminal collects a second live video stream in the mobile terminal, combines at least one of the first live video stream and the second live video stream into a third live video stream, and uploads the third live video stream to the server so that the server delivers the third live video stream to at least one user in a live-stream room.

Finally, the present disclosure further provides a system for controlling delivery of a video stream of a live-stream room. The system includes at least two terminals including a first terminal and a second terminal, and a server establishing a communication connection with the at least two terminals.

The second terminal outputs a link identifier representing pre-protocol information. The first terminal obtains the pre-protocol information outputted by the second terminal, initiates, with an anchor user identity, a connection request including the pre-protocol information to the server and uploads, in response to a confirmation instruction of an anchor user, a first live video stream generated in the first terminal to the server. The server sends, in response to the connection request, the first live video stream uploaded by the first terminal down to the second terminal. The second terminal receives the first live video stream down sent by the server, combines at least one of the first live video stream and a second live video stream collected in the second terminal into a third live video stream and uploads the third live video stream to the server. The server receives the third live video stream uploaded by the second terminal and delivers the third live video stream to a member user in a live-stream room.

Compared with the related art, the present disclosure has the following advantages.

In the present disclosure, in consideration of the live-stream content of the live-stream room including the video stream, the audio stream, barrage information, gift information, etc. Based on the separation and combination technologies of the live video stream, the live video streams of different terminals are combined through the anchor user terminal and uploaded to the server, and then the server delivers the combined video stream to each viewing user in the live-stream room, reducing the pressure on the server to combine too many video streams and saving resources.

In the meantime, the present disclosure uses the mobile terminal as the quick login and authentication entry for the anchor to perform live-streaming. Generally, a live-stream application on the mobile terminal is configured with an entry for the anchor to quickly start live-streaming, and the user only needs to log into the live-stream platform account and then may quickly start live-streaming on the mobile terminal. In such a manner, quick and automatic live-streaming on the PC terminal is supported without adding a third-party peripheral. A live-stream client on the PC terminal may quickly and automatically configure live-stream parameters to record pictures of the software/desktop on the PC if the third-party external camera is not added. The threshold of starting live-streaming of multi-end video streams is greatly lowered, and a quicker and more flexible multi-platform live-streaming process is achieved.

In addition, in the present disclosure, based on the account-separation system of the mobile terminal and the PC terminal, the higher-performance image processing capability of the PC terminal in conjunction with the convenience of the mobile terminal to quickly start live-streaming is used for the PC to process, combine and upload the live-stream content to the server. The server then delivers the processed and combined live-stream content to each viewing user in the live-stream room to ensure the time synchronization of the live video stream.

In summary, in the present disclosure, advantages of the respective video live-stream client on the mobile terminal and on the PC terminal are combined, which simplifies operation steps of the multi-platform and multi-view live-streaming and reduces the technical threshold of the multi-platform and multi-view live-streaming, so that the anchor user uses the multi-platform and multi-view simultaneous live-steaming more conveniently and quickly, which improves the efficiency of live-streaming and then improves user experience.

It is apparent that the above description of the advantages of the present disclosure is general. More advantages will be described in the following embodiments, and those skilled in the art may also reasonably discover other advantages of the present disclosure based on the content disclosed in the present disclosure.

Additional aspects and advantages of the present disclosure will be set forth in part in the following description, and will be apparent from the following description, or may be learned through practice of the present disclosure.

DETAILED DESCRIPTION

Figure 1:
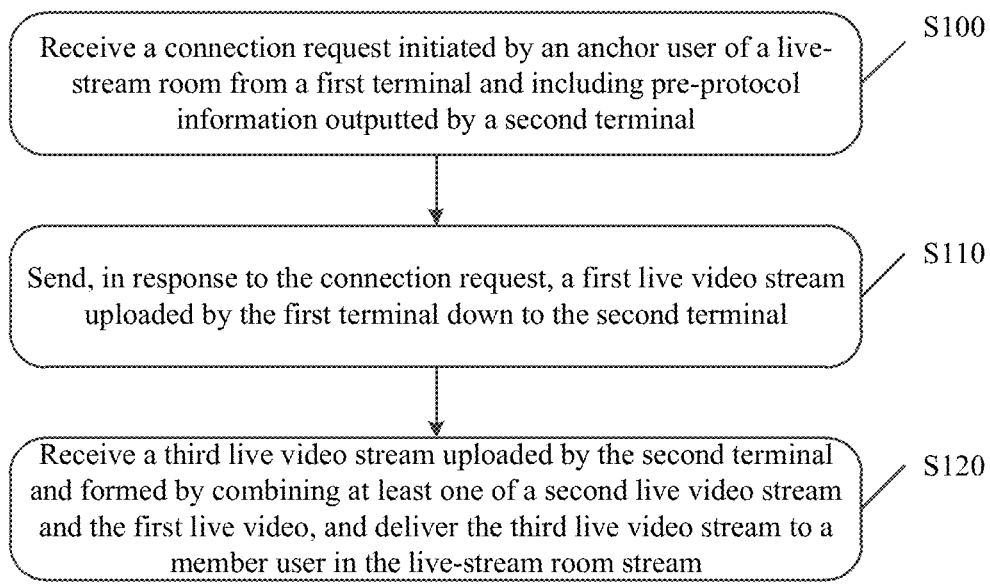
FIG. 1 is a flowchart of a method for controlling delivery of a video stream of a live-stream room according to an embodiment of the present disclosure.

Hereinafter the present disclosure will be further described in conjunction with the drawings and exemplary embodiments. Same reference numbers in the drawings denote same components. In addition, if a detailed description of a known art is not necessary to show the features of the present disclosure, the detailed description will be omitted.

It should be understood by those skilled in the art that unless expressly stated otherwise and as used herein, the singular forms, "a", "an", "the" and "this" may include the plural forms as well. It should be further understood that the word "including" used in the specification of the present disclosure means that the feature, integer, step, operation, element and/or component exists, but the existence or addition of one or more other features, integers, steps, operations, elements, components, and/or groups thereof is not precluded. It should be understood that when an element is referred to as being "connected" or "coupled" to another element, the element may be connected or coupled to the other element directly or through an intermediate element. In addition, "connection" or "coupling" used herein may include a wireless connection or a wireless coupling. As used herein, the word "and/or" includes all or any one and all combinations of one or more of the associated listed items.

It should be understood by those skilled in the art that unless otherwise defined, all terms (including technical terms and scientific terms) used herein have the same meaning as commonly understood by those of ordinary skill in the art to which the present disclosure belongs. It should also be understood that terms such as those defined in a general dictionary should be construed to have a meaning consistent with the meaning in the context of the related art, and should not be interpreted in an idealized or overly formal sense, unless as specifically defined herein.

It should be understood by those skilled in the art that, a "terminal" and "terminal device" used herein include both a device having a wireless signal receiver and having not the capability of transmitting, and a device having receiving and transmitting hardware and having hardware capable of receiving and transmitting bi-directionally on a bidirectional communication link. Such device may include: a cellular device or another communication device, which has a single-line display or has a multi-line display or does not have not the multi-line display; a personal communications service (PCS), which may combine capabilities of voice, data processing, faxing and/or data communications; a personal digital assistant (PDA), which may include a radio frequency receiver, a pager, internet/intranet access, a web browser, a notepad, a calendar and/or a global positioning system (GPS) receiver; and a conventional laptop and/or palmtop computer or another device, which has and/or includes a radio frequency receiver. The "terminal" and "terminal device" used herein may be portable, transportable and installed in a vehicle (aviation, sea and/or land), or adapted and/or configured to operate locally, and/or run in any other position on the Earth and/or in the space in a distributed form. The "terminal" and "terminal device" used herein may also be a communication terminal, an internet terminal, a music/video playback terminal, for example, a PDA, a mobile Internet device (MID), and/or a mobile phone having a music/video playback function, and may also be a smart TV, a set-top box and another device.

It should be understood by those skilled in the art that a remote network device used herein includes, but is not limited to, a computer, a network host, a single web server, multiple network server sets, or a cloud composed of multiple servers. In this regard, the cloud is composed of a large number of computers or web servers based on cloud computing. The cloud computing is a type of distributed computing, and is a super-virtual computer comprised of a group of loosely coupled sets of computers. In an embodiment of the present disclosure, communication may be performed between the remote network device, the terminal device and a windows notification service (WNS) server in any communication manner including but not limited to a manner of mobile communication based on 3rd Generation Partnership Project (3GPP), long term evolution (LTE), and worldwide interoperability for microwave access (WIMAX), a manner of computer network communication based on transmission control protocol (TCP)/Internet protocol (IP) and user datagram protocol (UDP) protocols, and manner of near wireless transmission based on Bluetooth and infrared transmission standards.

It should be understood by those skilled in the art that the user interface/operation interface described herein broadly refers to a display interface that may be used to send control instructions to the smart terminal, and may refer to, for example, an option (or key added by the application program) on a configuration page in the Android system, or an option in a notification bar from the desktop or on an interaction page, or an option on a page constructed by one active component of the application program.

It should be understood by those skilled in the art that the terms "application", "application program", "application software" and the like as referred to herein are the same concepts that are well known to those skilled in the art and refer to computer software that is suitable for being electronically operated and that is organically constructed by a series of computer instructions and relevant data resources. Unless otherwise specified, such naming itself is not limited by the type and level of the programming language, nor by the operating system or platform on which the above computer software operates. Of course, such concepts are not limited by any form of terminal.

Live-stream room: The live-stream room includes the followings. (1) The live-stream room is a virtual space (or virtual room) created based on the network live-stream platform. The live-stream room is generally created by the anchor client and connected to multiple viewing clients, that is, the anchor and multiple viewers are included in the live-stream room. The viewing clients located in the virtual space may watch the live-stream content of the anchor client, and interactions of voice, picture, text or electronic gift giving may be performed between the user of the anchor client and the user of the viewing clients and between the users of the viewing clients. (2) The live-stream room is an instant communication platform on which users are assembled together in groups. For example, the live-stream room is a video conference system. A user logs into the client to enter the group, and exists as a member of the group. The same group includes multiple group members. The user may join or leave the group arbitrarily. In the group, various interactions of text, voice, video and the like may be performed.

In a first aspect, FIG. 1 is a flowchart of a method for controlling delivery of a video stream of a live-stream room according to an embodiment of the present disclosure. The method is performed by a network device. The network device includes, but is not limited to, a single network server, a server group comprised of multiple network servers, or a cloud composed of a large number of hosts or network servers based on cloud computing. The method includes steps S100 to S120.

In step S100, a connection request initiated by an anchor user of a live-stream room from a first terminal and including pre-protocol information outputted by a second terminal is received.

The first terminal of the anchor user of the live-stream room identifies a link identifier representing pre-protocol information and outputted by the second terminal, and obtains the pre-protocol information. Then the first terminal initiates the connection request including the pre-protocol information to the server, and the server receives the connection request for subsequent processing.

Specifically, the pre-protocol information includes a unique device identifier of the second terminal and an authorization token or authentication information for establishing a dedicated link between the server and the terminal. The pre-protocol information is processed in an encryption manner and stored in the link identifier representing the pre-protocol information, and must be parsed and obtained from the link identifier through a corresponding authorized application program. Generally, the encryption manner of the pre-protocol information and the link identifier representing the pre-protocol information are defined by each live-stream platform itself, and the pre-protocol information can be obtained after the application program authorized by the live-stream platform identifies the link identifier.

In an embodiment, the link identifier representing the pre-protocol information is outputted in the form of a QR code. The QR code is a black and white graphic recording data symbol information and distributed on a two-dimensional plane through a specific geometric figure according to a predetermined rule. The QR code skillfully uses the concept of "0" and "1" bitstreams that form the basis of the computer's internal logic, and uses multiple geometric shapes corresponding to binary to represent text, numerical values, etc. The QR code may be identified and read by an image input device or a photoelectric scanning device to obtain information included in the QR code. The QR code has multiple commonalities of the bar code technology: each code mechanism has its own specific character set; each character occupies a predetermined width; the QR code has a certain check function.

In step S110, in response to the connection request, a first live video stream uploaded by the first terminal is sent down to the second terminal.

The server checks the pre-protocol information in the connection request in response to the connection request. If the pre-protocol information conforms to the pre-protocol information rule defined by the live-stream platform, the connection request is regarded as a legal connection request. The unique device identifier of the first terminal, identity information of the anchor user, and characteristic information of the live-stream room are sent to the second terminal for establishing a dedicated communication link between the server and the second terminal, and then the first live video stream uploaded by the first terminal is sent down to the second terminal.

In an embodiment, after the server receives the connection request and establishes the dedicated network communication link between the server and the second terminal, information about completing establishment of connection with the second terminal is fed back to the first terminal, and the first live video stream uploaded by the first terminal is sent down to the second terminal after the confirmation instruction from the first terminal is received. In the meantime, a control instruction for collecting the second live video stream is sent to the second terminal to generate, on a user interface of the second terminal, a control window for collecting the second live video stream. Then the anchor user selects the video source of the second live video stream in the control window, and the second live video stream can be quickly collected.

In S120, a third live video stream uploaded by the second terminal and formed by combining at least one of a second live video stream and the first live video stream is received and delivered to a member user in the live-stream room.

Specifically, the first live video stream, the second live video stream, and the third live video stream each include an image stream and an audio stream, and the third live video stream includes at least one of the image stream of the first live video stream and the image stream of the second live video stream and further includes at least one of the audio stream of the first live video stream and the audio stream of the second live video stream. The type of the third live video stream includes the following types:

(1) the image stream of the first live video stream and the audio stream of the first live video stream;

(2) the image stream of the second live video stream and the audio stream of the second live video stream;

(3) the image stream of the first live video stream, the audio stream of the first live video stream, and the image stream of the second live video stream;

(4) the image stream of the first live video stream, the image stream of the second live video stream and the audio stream of the second live video stream; and (5) the image stream of the first live video stream, the audio stream of the first live video stream, the image stream of the second live video stream, and the audio stream of the second live video stream.

Figure 4:
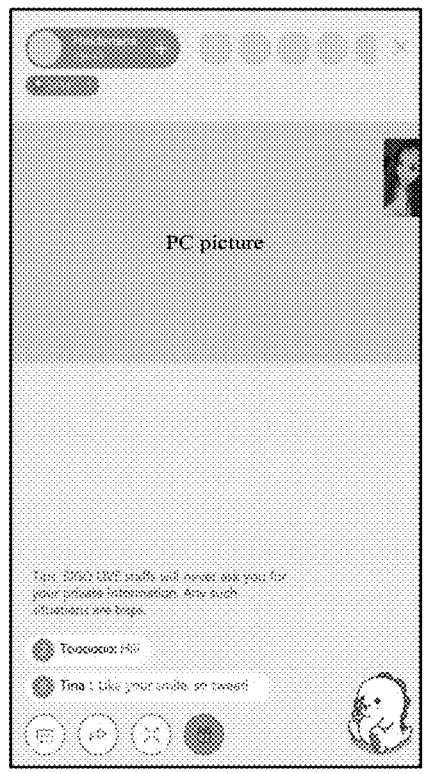
FIG. 4 is a schematic diagram illustrating a combination mode selection window displayed on an operation interface of a first terminal after a connection is established between a server and the first terminal according to an embodiment.

FIG. 4 is a schematic diagram illustrating a combination mode selection window displayed on an operation interface of a first terminal after a connection is established between a server and the first terminal according to an embodiment. The third live video stream includes the image stream of the first live video stream and the image stream of the second live video stream, and may further include the audio stream of the first live video stream and the audio stream of the second live video stream. The image stream of the first live video stream is the character window shown in the figure, and the image stream of the second live video stream is the image window of the "PC picture" shown in the figure, which achieves multi-view and cross-platform synchronous live-streaming.

In an embodiment, the on/off options of the corresponding video stream and audio stream are provided on the first terminal and the second terminal for the anchor user to select. When the anchor user selects to turn on/off the image stream or the audio stream of a certain video stream, the corresponding combined third live video stream is changed accordingly, so that the anchor user can better display the content of the live-stream room as needed. For example, when the current third live video stream is of the type (5) and the anchor user wants to temporarily turn off the image stream and the audio stream of the first live video stream, so as to interact better with the viewer user through the second video stream and the audio stream, the anchor user may select to turn off the first live video stream on the first terminal, the second live video stream collected by the second terminal is used as the combined third video stream, and then the server receives the third live video stream uploaded by the second terminal and delivers the third live video stream to the viewer user in the live-stream room. In an embodiment, the anchor user may also select to turn off the first live video stream on the second terminal, and at this time the server does not send the first live video stream to the second terminal. Then the second live video stream collected by the second terminal is used as the combined third video stream and uploaded to the server. The server delivers the third live video stream to the viewing user in the live-stream room. For example, on/off option buttons of the first live video stream and the audio stream are provided on the user interface of the second terminal. After the anchor user selects the "off" option button, the communication link for receiving the first live video stream is closed, and the first live video stream is not received again.

In an embodiment, the anchor user may further set the display area sizes of the image stream of the first live video stream and the image stream of the second live video stream on the user interface of the second terminal, the corresponding combined third live video stream is modified according to the modification of the first live video stream and the second live video stream, the modified third live video stream is uploaded to the server, and then the server delivers the modified third live video stream to the live-stream room, which provides the anchor user with more custom options to ensure display of the live-stream content of the live-stream room.

Figure 2:
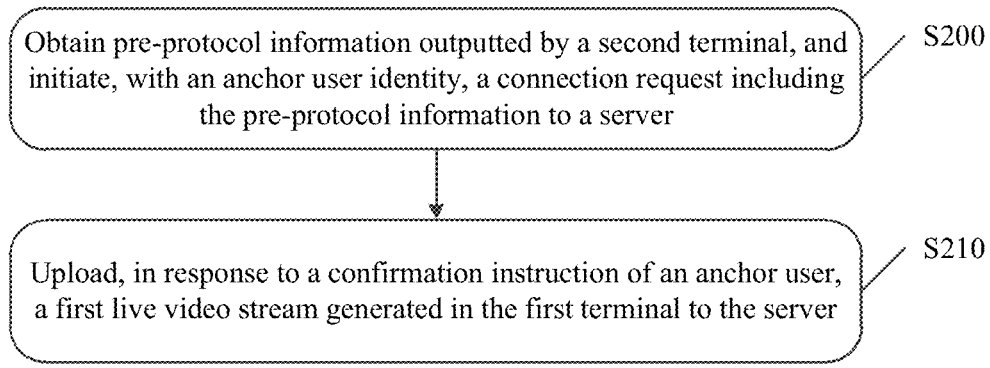
FIG. 2 is a diagram flowchart of a method for controlling delivery of a video stream of a live-stream room according to an embodiment of the present disclosure.

In a second aspect, FIG. 2 is a flowchart of a method for controlling delivery of a video stream of a live-stream room according to an embodiment of the present disclosure. In the embodiment, the method is executed by a first terminal, and the first terminal may be a mobile terminal. The method may also be understood to be executed by a video live-stream application on the first terminal, and includes steps S200 to S210.

In step S200, pre-protocol information outputted by a second terminal is obtained, and a connection request including the pre-protocol information is initiated to a server by using an anchor user identity.

Specifically, the pre-protocol information includes a unique device identifier of the second terminal and an authorization token or authentication information for establishing a dedicated link between the server and the terminal. The pre-protocol information is processed in an encryption manner and stored in the link identifier representing the pre-protocol information, and must be parsed and obtained from the link identifier through a corresponding authorized application program. Generally, the encryption manner of the pre-protocol information and the link identifier representing the pre-protocol information are defined by each live-stream platform itself, and the pre-protocol information can be obtained after the application program authorized by the live-stream platform identifies the link identifier.

Figure 5:
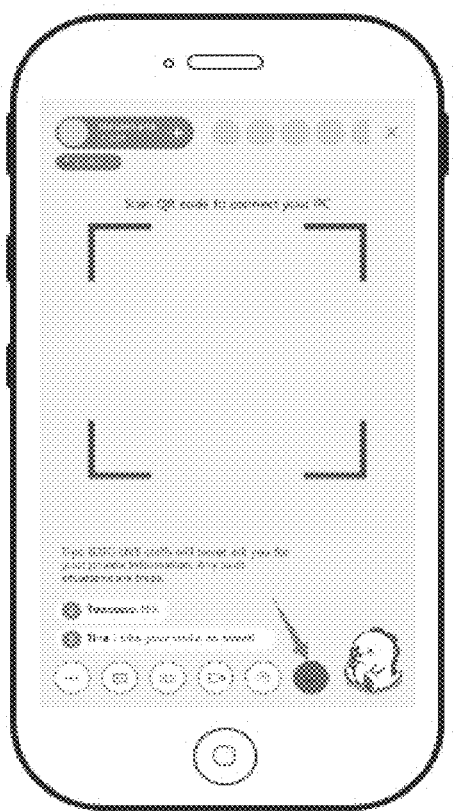
FIG. 5 is a schematic diagram illustrating an operation interface of a first terminal obtaining pre-protocol information.

The first terminal of the anchor user of the live-stream room identifies the link identifier representing the pre-protocol information and outputted by the second terminal, and then obtains the pre-protocol information. In other words, the user runs the video live-stream application on the first terminal to identifies, with the anchor identity and according to the representation form of the pre-protocol information, the link identifier representing the pre-protocol information, obtain the pre-protocol information, initiate a connection request including the pre-protocol information to the server, and send the unique device identifier of the first terminal, identity information of the anchor user, and characteristic information of the live-stream room to the second terminal. The identity information of the anchor user is the anchor user unique identifier (UID) on the live-stream platform, and is used to represent the unique anchor user. In addition, the characteristic information of the live-stream room is the channel identifier (ID) of the live-stream room. FIG. 5 is a schematic diagram illustrating an operation interface of a first terminal obtaining pre-protocol information. A button such as "PC live-streaming" pointed by the arrow in FIG. 5 is clicked, a scan box appears, the link identifier representing the pre-protocol information and outputted by the second terminal in the form of a QR code is scanned, and then the corresponding pre-protocol information is obtained. At the same time, the connection request including the pre-protocol information is initiated to the server by using the anchor identity.

In step S210, a first live video stream generated in the first terminal is uploaded to the server in response to a confirmation instruction of an anchor user.

The server checks the pre-protocol information in response to the connection request. If the pre-protocol information conforms to the pre-protocol information rule defined by the live-stream platform, the connection request is regarded as a legal connection request. The unique device identifier of the first terminal, identity information of the anchor user, and characteristic information of the live-stream room are sent to the second terminal for establishing a dedicated communication link between the server and the second terminal. After the server establishes the dedicated communication link between the server and the second terminal, prompt information of completing establishment of connection is fed back to the first terminal. The first terminal receives the prompt information, and then generates an operation interface, on the user interface of the first terminal, for confirming the connection and for receiving a confirmation instruction from the anchor user. For example, a button such as a connection "confirm" button is provided on the user interface of the first terminal, and when the confirmation instruction from the anchor user is received, the first live video stream generated in the first terminal is uploaded to the server so that the server sends the first live video stream down to the second terminal.

In an embodiment, after the anchor user confirms the connection, the first terminal sends a control instruction for collecting the second live video stream to the second terminal through the server to generate, on a user interface of the second terminal, a control window for collecting the second live video stream. Then the anchor user selects the video source of the second live video stream in the control window, and the second live video stream can be quickly collected.

Figure 3:
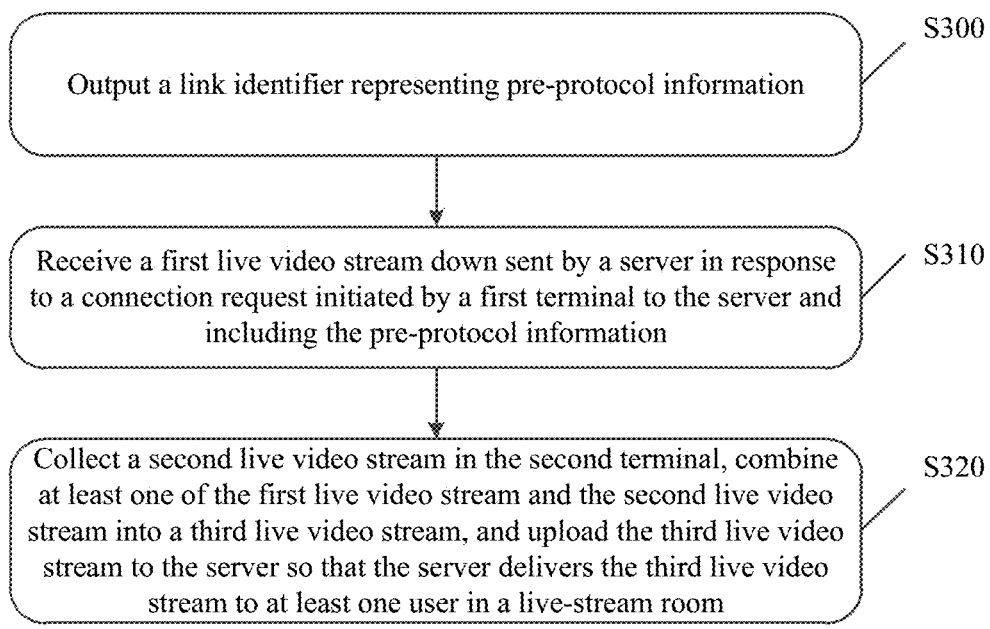
FIG. 3 is a schematic diagram of a third live video stream according to an embodiment of the present disclosure.

In a third aspect, FIG. 3 is a flowchart of a method for controlling delivery of a video stream of a live-stream room according to another embodiment of the present disclosure. In the embodiment, the method is executed by a second terminal. In consideration of the image processing performance of the terminal, the second terminal may be a PC terminal. The method may also be understood to be executed by a video live-stream client on the second terminal, and includes steps S300 to S320.

In step S300, a link identifier representing pre-protocol information is outputted.

Specifically, the pre-protocol information includes a unique device identifier of the second terminal and an authorization token or authentication information for establishing a dedicated link between a server and the terminal. The pre-protocol information is processed in an encryption manner and stored in the link identifier representing the pre-protocol information, and must be parsed and obtained from the link identifier through a corresponding authorized application program. Generally, the encryption manner of the pre-protocol information and the link identifier representing the pre-protocol information are defined by each live-stream platform itself, and the pre-protocol information can be obtained after the application program authorized by the live-stream platform identifies the link identifier. In an embodiment, the link identifier representing the pre-protocol information is outputted in the form of a QR code. For example, a button such as a "sharing live-streaming" button is provided on the operation interface of the video live-stream client on the PC terminal, and is used to generate the link identifier of the pre-protocol information and present the link identifier on the user interface of the terminal. After the user clicks the "sharing live-streaming" button, a QR code is outputted on the operation interface of the video live-stream client, and the video live-stream client on the first terminal authorized by the live-stream platform can obtain the pre-protocol information by scanning the QR code.

In step S310, a first live video stream down sent by a server is received in response to a connection request initiated by a first terminal to the server and including the pre-protocol information.

The first terminal of the anchor user of the live-stream room identifies the link identifier representing the pre-protocol information and outputted by the second terminal, and obtains the pre-protocol information. Then the first terminal initiates the connection request including the pre-protocol information to the server. In response to the connection request, the second terminal receives a unique device identifier of the first terminal, identity information of the anchor user, and characteristic information of the live-stream room sent by the server, so that a dedicated communication link between the second terminal and the server is established, and the first live video stream down sent by the server is received through the dedicated link.

In an embodiment, after the second terminal responds to the connection request and establishes the dedicated communication link between the second terminal and the server and when the server receives a confirmation instruction of the first terminal and feeds back the confirmation instruction to the second terminal, the first live video stream down sent by the server is received.

In step S320, a second live video stream in the second terminal is collected, at least one of the first live video stream and the second live video stream is combined into a third live video stream, and the third live video stream is uploaded to the server so that the server delivers the third live video stream to at least one user in a live-stream room.

When the confirmation instruction sent from the first terminal and fed back by the server, the second terminal receives from the server a control instruction for collecting the second live video stream. The second terminal receives the control instruction, and generates, on a user interface, a control window for collecting the second live video stream. Then the anchor user selects the video source of the second live video stream in the control window, and the second live video stream can be quickly collected. Generally, the image stream of the second live video stream collected by the second terminal includes a process picture (such as a game window picture) and a desktop picture (i.e., the entire desktop picture of the second terminal), so the above two image stream options are included in the control window. The user collects the corresponding video source as the second live video stream according to the needs of the user. Then the anchor user selects to deliver a third live video stream. At this time, the second terminal collects the second live video stream, meanwhile combines the received first live video stream and the second live video stream to the third live video stream, and uploads the third live video stream to the server so that the server delivers the third live video stream to at least one user in the live-stream room.

Specifically, processes of the second terminal receiving the first live video stream, collecting the second live video stream, combining the first live video stream and the second live video stream into the third live video stream, and uploading the third live video stream are performed in parallel. The parallel operation refers to that two or more operations of the same or different natures are completed at the same time or within the same time interval. The parallel operation has the following characteristics. (1) Time overlap: Adjacent processing processes are staggered in time, and parts of the same set of hardware are used in turn. (2) Resource sharing: Multiple users use the same set of resources in turn in a certain time sequence to improve resource utilization. (3) Resource duplication: The hardware resource is redundantly set to improve hardware reliability and performance. Specifically, for the embodiment of the present disclosure, the parallel operation refers to that when the second terminal receives the first live video stream, the second terminal may simultaneously/synchronously collect the second live video stream, simultaneously/synchronously combines the received first live video stream and the collected second live video stream into the third live video stream, and simultaneously/synchronously uploads the third live video stream to the server, which ensures simultaneity/synchronization of the live video stream.

In an embodiment, the on/off options of the video stream and the audio stream of the first live video stream and the video stream and the audio stream of the second live video stream are provided on the second terminal for the anchor user to select. When the anchor user selects to turn on/off the image stream or the audio stream of a certain live video stream, the corresponding combined third live video stream is changed accordingly, so that the anchor user can better display the content of the live-stream room as needed.

In an embodiment, the anchor user may further set the display area sizes of the image stream of the first live video stream and the image stream of the second live video stream on the user interface of the second terminal, the corresponding combined third live video stream is modified according to the modification of the first live video stream and the second live video stream, the modified third live video stream is uploaded to the server, and then the server delivers the modified third live video stream to the live-stream room, which provides the anchor user with more custom options to ensure display of the live-stream content of the live-stream room.

Figure 6:
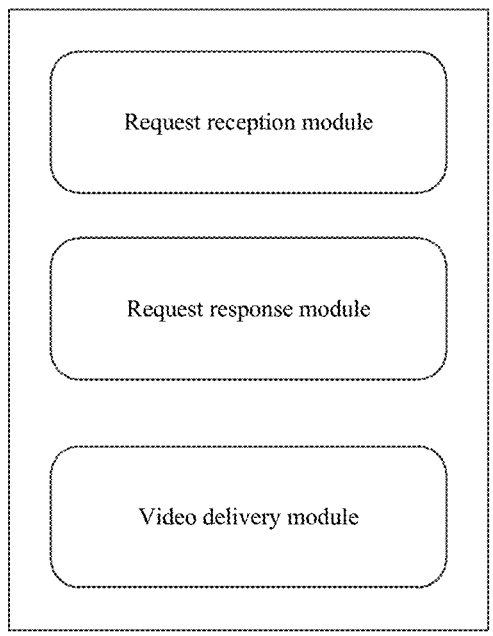
FIG. 6 is a schematic diagram of an apparatus for controlling delivery of a video stream of a live-stream room according to an embodiment of the present disclosure.

Corresponding to the method in the first aspect, FIG. 6 illustrates an apparatus for controlling delivery of a video stream of a live-stream room according to the present disclosure. The apparatus includes a request reception module, a request response module and a video delivery module. The request reception module is configured to receive a connection request initiated by an anchor user of the live-stream room from a first terminal and including pre-protocol information outputted by a second terminal. The request response module is configured to respond to the connection request and send a first live video stream uploaded by the first terminal down to the second terminal. The video delivery module is configured to receive a third live video stream uploaded by the second terminal and formed by combining at least one of a second live video stream and the first live video stream, and deliver the third live video stream to a member user in the live-stream room.

Figure 7:
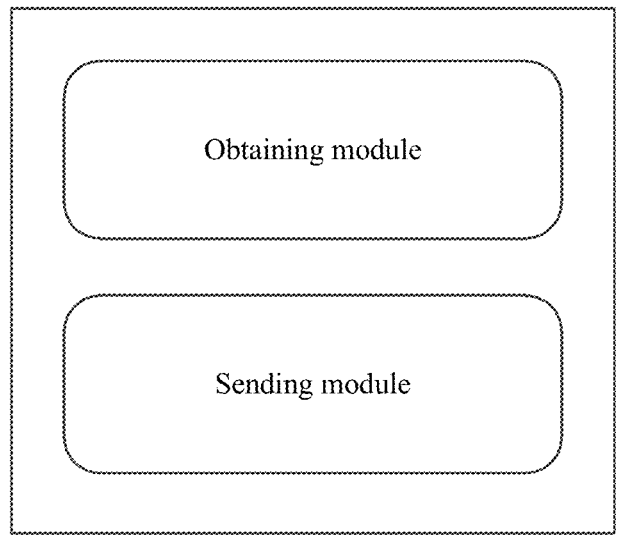
FIG. 7 is a schematic diagram of an apparatus for controlling delivery of a video stream of a live-stream room according to an embodiment of the present disclosure.

Corresponding to the method in the second aspect, FIG. 7 is an apparatus for controlling delivery of a video stream of a live-stream room according to the present disclosure. The apparatus includes an obtaining module and a sending module. The obtaining module is configured to obtain pre-protocol information outputted by a second terminal, and initiate, with an anchor user identity, a connection request including the pre-protocol information to a server. The sending module is configured to respond to a confirmation instruction of an anchor user, and upload a first live video stream generated in the first terminal to the server.

Figure 8:
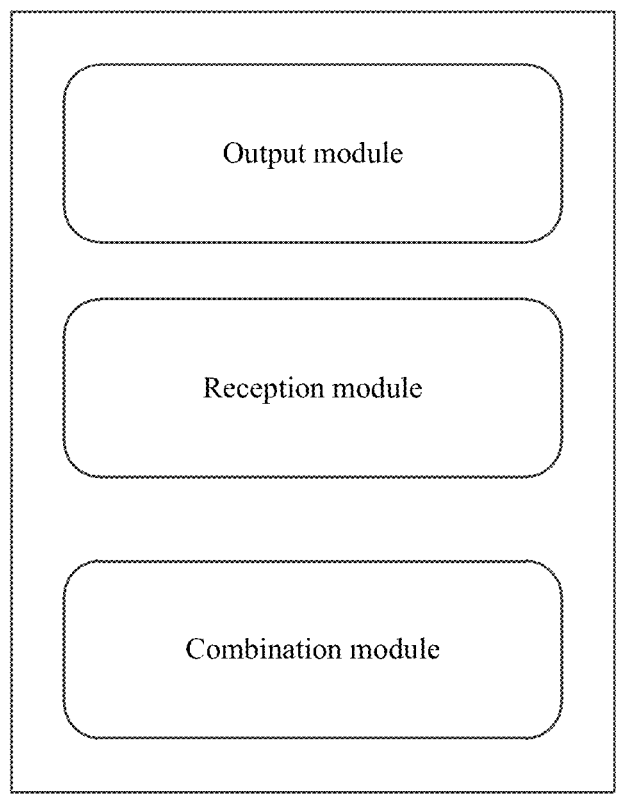
FIG. 8 is a schematic diagram of an apparatus for controlling delivery of a video stream of a live-stream room according to an embodiment of the present disclosure.

Corresponding to the method in the third aspect, FIG. 8 is an apparatus for controlling delivery of a video stream of a live-stream room the present disclosure. The apparatus includes an output module, a reception module and a combination module. The output module is configured to output a link identifier representing pre-protocol information. The reception module is configured to receive a first live video stream down sent by a server in response to a connection request initiated by a first terminal to the server and including the pre-protocol information. The combination module is configured to collect a second live video stream in the second terminal, combine at least one of the first live video stream and the second live video stream into a third live video stream, and upload the third live video stream to the server so that the server delivers the third live video stream to at least one user in a live-stream room.

Additionally, corresponding to the first aspect, the present disclosure further provides a server including a processor. The processor is configured to execute the steps described below.

A connection request initiated by an anchor user of a live-stream room from a first terminal and including pre-protocol information outputted by a second terminal is received.

In response to the connection request, a first live video stream uploaded by the first terminal is sent down to the second terminal.

A third live video stream uploaded by the second terminal and formed by combining at least one of a second live video stream and the first live video stream is received and delivered to a member user in the live-stream room.

Additionally, corresponding to the second aspect, the present disclosure further provides a mobile terminal including a processor, a memory, a touch-sensitive display, and a camera. The processor is configured to execute the steps described below.

Pre-protocol information outputted by a second terminal is obtained, and a connection request including the pre-protocol information is initiated to a server with an anchor user identity.

In response to a confirmation instruction of an anchor user, a first live video stream generated in the mobile terminal is uploaded to the server.

Finally, corresponding to the third aspect, the present disclosure further provides a mobile terminal configured to execute the steps described below.

A link identifier representing pre-protocol information is outputted.

A first live video stream down sent by a server is received in response to a connection request initiated by a first terminal to the server and including the pre-protocol information.

A second live video stream in the mobile terminal is collected, and at least one of the first live video stream and the second live video stream into a third live video stream, and the third live video stream is uploaded to the server so that the server delivers the third live video stream to at least one user in a live-stream room.

Figure 9:
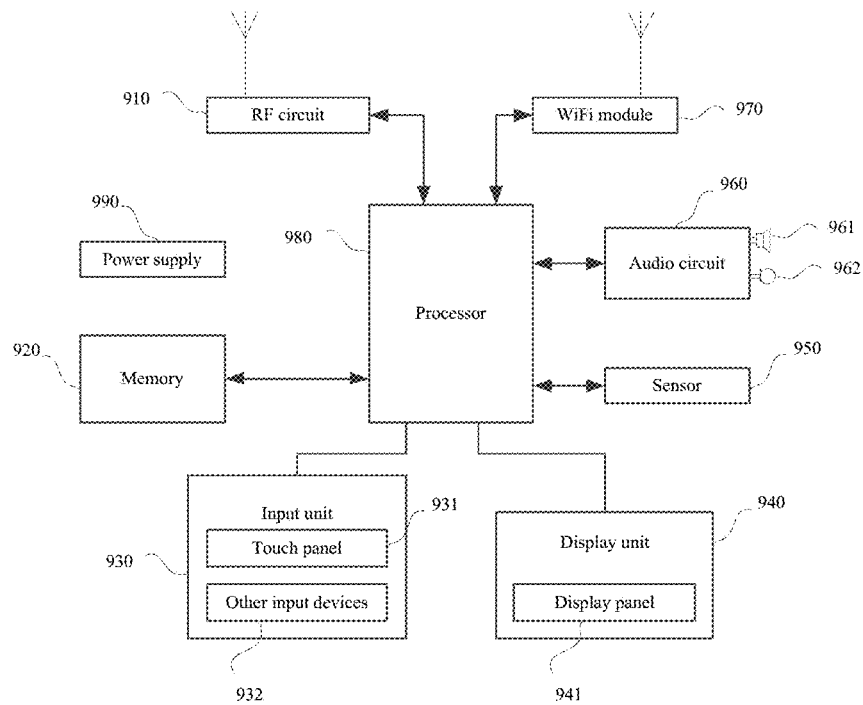
FIG. 9 is a schematic diagram illustrating a structure of a mobile terminal according to an embodiment of the present disclosure.

FIG. 9 is a schematic diagram of a structure of a mobile terminal according to an embodiment of the present disclosure. The mobile terminal may be a mobile phone, a tablet computer, a personal digital assistant (PDA), a point of sales (POS), an on-board computer, and any other mobile terminals. The mobile phone as the mobile terminal is taken as an example. Referring to FIG. 9, the mobile phone includes: a radio frequency (RF) circuit 910, a memory 920, an input unit 930, a display unit 940, a sensor 950, an audio circuit 960, a wireless fidelity (WiFi) module 970, a processor 980, a power supply 990, and other components. It should be understood by those skilled in the art that the structure of the mobile phone illustrated in FIG. 9 does not limit the mobile phone, and the mobile phone may include more or fewer components than those illustrated, or may be configured by combining certain components or using different components.

The various components of the mobile phone are described in detail with reference to FIG. 9.

The RF circuit 910 may be used for receiving and sending signals during information reception and transmission or during the call. In particular, the RF circuit 910 receives downlink information of a base station, and sends the downlink information to the processor 980. In addition, the RF circuit 910 sends the designed uplink data to the base station. Generally, The RF circuit 910 includes, but is not limited to, an antenna, at least one amplifier, a transceiver, a coupler, a low noise amplifier (LNA), a duplexer, and the like. In addition, the RF circuit 910 may also communicate with the network and other devices via wireless communication. Any communication standard or protocol may be used for the above wireless communication, and includes, but is not limited to, global system of mobile communication (GSM), general packet radio service (GPRS), code division multiple access (CDMA), wideband code division multiple access (WCDMA), long term evolution (LTE), E-mail, short messaging service (SMS), and the like.

The memory 920 may be used to store software programs and modules, and the processor 980 executes various functional applications and data processing of the mobile phone by running the software programs and modules stored in the memory 920. The memory 920 may mainly include a program storage area and a data storage area. The program storage area may store an operating system, at least one application program required for functions (e.g., a sound playback function, an image playback function, etc.). The data storage area may store data (audio data, a phone book, etc.) and the like created according to the use of the mobile phone. In addition, the memory 920 may include a high-speed random access memory, and may also include a nonvolatile memory, such as at least one dick memory, flash memory or another nonvolatile solid-state memory.

The input unit 930 may be used for receiving inputted digital or character information and for generating key signal input related to user settings and function control of the mobile phone. Specifically, the input unit 930 may include a touch panel 931 and other input devices 932. The touch panel 931, also referred to as a touch screen, may collect touch operations (such as an operation performed on the touch panel 931 or near the touch panel 931 by a user using a finger, a stylus, and any other suitable objects or accessories) performed on or near the touch panel 931 by the user, and drive the corresponding connecting apparatus according to a preset program. In an embodiment, the touch panel 931 may include two parts: a touch detection apparatus and a touch controller. The touch detection apparatus detects the touch position and orientation of the user, obtains a signal brought by the touch operation, and transmits the signal to the touch controller. The touch controller receives the touch information from the touch detection apparatus, converts the touch information into contact coordinates, and sends the contact coordinates to the processor 980, and can also receive a command from the processor 980 and execute the command. In addition, the touch panel 931 may be implemented in the touch panel 931 of various types such as resistive, capacitive, infrared, and surface acoustic. In addition to the touch panel 931, the input unit 930 may also include other input devices 932. Specifically, other input devices 932 may include, but are not limited to, one or more of a physical keyboard, a functional key (such as a volume control key, a switch key, etc.), a trackball, a mouse, a lever, and the like.

The display unit 940 may be used for displaying information inputted by the user or information provided to the user as well as various menus of the mobile phone. The display unit 940 may include a display panel 941. In an embodiment, the display panel 941 may be configured in the form of a liquid crystal display (LCD), an organic light-emitting diode (OLED), and the like. Further, the touch panel 931 may cover the display panel 941. When the touch panel 931 detects a touch operation on or near the touch panel 931, the touch operation is transmitted to the processor 980 to determine a type of the touch event, and then the processor 980 provides a corresponding visual output on the display panel 941 according to the type of the touch event. Although the touch panel 931 and the display panel 941 are used as two independent components to implement the input and output functions of the mobile phone in FIG. 9, in some embodiments, the touch panel 931 and the display panel 941 may be integrated to implement the input and output functions of the mobile phone.

The mobile phone may also include at least one type of sensor 950, such as a light sensor, a motion sensor, and other sensors. Specifically, the light sensor may include an ambient light sensor and a proximity sensor. The ambient light sensor may adjust the brightness of the display panel 941 according to the brightness of the ambient light. The proximity sensor may turn off the display panel 941 and/or backlight when the mobile phone moves to the ear. As a type of motion sensor, an accelerometer sensor may detect the magnitude of acceleration in all directions (usually three axes). When in a stationary state, the accelerometer sensor may detect the magnitude and direction of gravity, may be used to an application for identifying the gesture of the mobile phone (such as horizontal and vertical screen switching, related game, and magnetometer gesture calibration), and functions related to vibration identification (such as pedometer, tapping), etc. Other sensors such as a gyroscope, a barometer, a hygrometer, a thermometer, an infrared sensor, and the like that can be configured on the mobile phone are not described herein.

The audio circuit 960, a speaker 961, and a microphone 962 may provide an audio interface between the user and the mobile phone. The audio circuit 960 may transmit the electrical data converted from the received audio data to the speaker 961, and the electrical data is converted by the speaker 961 to a sound signal to be outputted. On the other hand, the microphone 962 converts the collected sound signal into an electrical signal, the electrical signal is received by the audio circuit 960 and then converted into audio data, the audio data is outputted, processed by the processor 980, and sent to for example another mobile phone via the RF circuit 910. Or the audio data is outputted to the memory 920 for further processing.

WiFi belongs to a short-range wireless transmission technology. The mobile phone may help a user to send and receive emails, browse web pages, and access streaming media through the WiFi module 970. WiFi provides the user with wireless broadband Internet access. Although FIG. 9 shows the WiFi module 970, it should be understood that the WiFi module 970 is not a must for the mobile phone, and may be omitted as needed without altering the spirit of the present disclosure.

The processor 980 is a control center of the mobile phone, connects various parts of the entire mobile phone by using various interfaces and lines, and executes various functions and data processing of the mobile phone by running or executing software programs and/or modules stored in the memory 920 and invoking data stored in the memory 920, so as to monitor the mobile phone integrally. In an embodiment, the processor 980 may include one or more processing units. In an embodiment, the processor 980 may integrate an application processor and a modem processor. The application processor mainly serves for the operating system, the user interface, the application program, and the like. The modem processor mainly serves for wireless communication. It should be understood that the above modem processor may also not be integrated into the processor 980.

The mobile phone further includes a power supply 990 (such as a battery) that supplies power to the various components. In an embodiment, the power supply may be logically connected to the processor 980 through a power supply management system so as to implement functions such as charging, discharging, and power management through the power supply management system.

The mobile phone further includes a camera, although not shown. The camera is electrically connected to the processor 980 and other components of the mobile phone.

Figure 10:
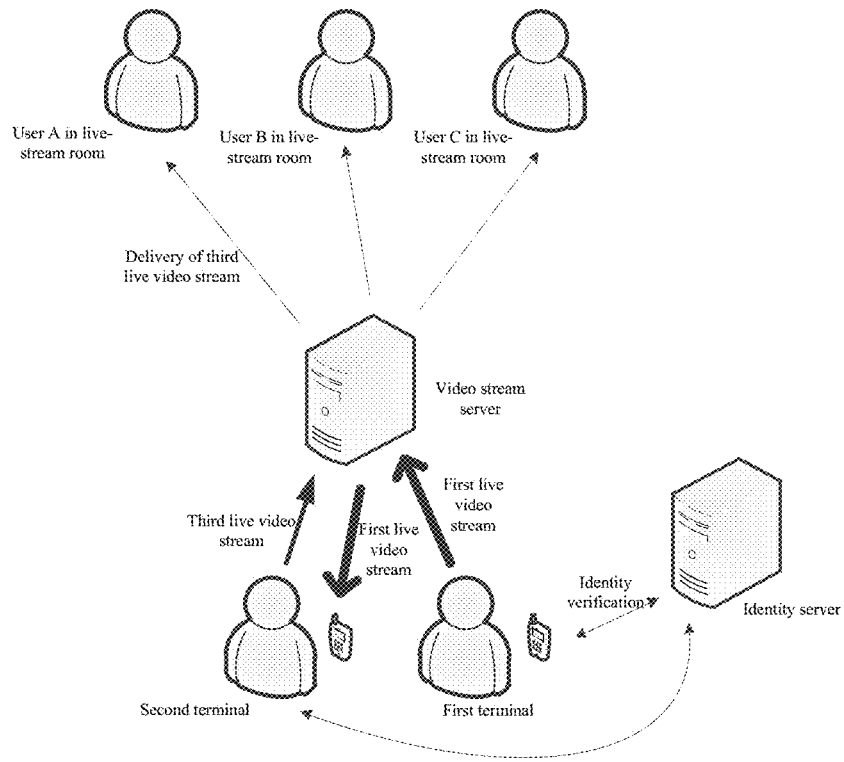
FIG. 10 is a schematic diagram illustrating a system for implementing the method of controlling delivery of a video stream of a live-stream room according to the present disclosure.

FIG. 10 is a schematic diagram illustrating a system for implementing the method for controlling delivery of a video stream of a live-stream room according to the present disclosure. The system includes a first terminal, a second terminal, multiple servers and multiple viewing users. The schematic diagram of the system shows the main flowchart of the method described in the present disclosure. The anchor user initiates, from the first terminal to an identity server, a connection request including the pre-protocol information outputted by the second terminal. The identity server checks the pre-protocol information and sends the unique device identifier of the first terminal, the identity information of the anchor user and characteristic information of the live-stream room to the second terminal. Then a communication link between a video stream server and the first terminal is established for receiving the first live video stream uploaded by the first terminal, and a dedicated link between the video stream server and the second terminal is established for sending the first live video stream down to the second terminal. The second terminal simultaneously collects the local second live video stream and combines at least one of the first live video stream and the second live video stream into the third live video which is then uploaded to the video stream server. Then the video stream server delivers the third live video stream to users A, B, and C in the live-stream room.

An implementation process of the present disclosure is described below in combination with a server, a first terminal (mobile terminal), and a second terminal (PC terminal). If the user needs to quickly live-stream the game picture and the personal image simultaneously, the user firstly needs to start the video live-stream application program on the mobile terminal, logs into the live-stream platform account and quickly creates a live-stream room. At this time, the user is the anchor user. In addition, the user starts the video live-stream client on the PC terminal, logs into the live-stream platform account, clicks the "sharing live-streaming" button on the PC terminal to output, on the user interface of the PC terminal, a link identifier (taking the QR code as the link identifier representing the pre-protocol information as an example) representing the pre-protocol information, and then clicks the "PC live-streaming" button on the mobile terminal. A QR code scanning interface is popped up, and the camera of the mobile terminal is used to scan the QR code outputted on the interface of the PC terminal to obtain the pre-protocol information represented by the QR code. Then a connection request including the pre-protocol information is initiated to the server. After the server completes verification of the request, the unique device identifier of the mobile terminal, the UID of the anchor user, and the channel ID of the live-stream room are sent to the PC terminal. At this time, the communication links between the video stream server and the mobile terminal and between the video stream server and the PC terminal are established, and the connection establishment completion information is fed back to the first terminal. After the user completes the confirmation of connection on the mobile terminal, the first live video stream generated locally is uploaded to the video stream server, and the video stream server sends the first live video stream down to the PC terminal. Then, the user selects on the PC the video source to be collected as the second live video stream, and the PC terminal combines the received first live video stream with the locally collected second live video stream into a third live video stream. The user may adjust and control the size and proportion of the image picture of the first live video stream and the second live video stream respectively on the PC terminal to better display the live-stream content. Finally, the PC terminal uploads the combined third live video stream to the video stream server. The video stream server delivers the third live video stream to each viewing user in the live-stream room.

A method for controlling delivery of a video stream of a live-stream room includes the steps described below.

A connection request initiated by an anchor user of a live-stream room from a first terminal and including pre-protocol information outputted by a second terminal is received. In response to the connection request, a first live video stream uploaded by the first terminal is sent down to the second terminal.

A third live video stream uploaded by the second terminal and formed by combining at least one of a second live video stream and the first live video stream is received and delivered to a member user in the live-stream room.

In the above method for controlling delivery of a video stream of a live-stream room, the following technical content is further included.

The step in which in response to the connection request, the first live video stream uploaded by the first terminal is sent down to the second terminal is specifically described as follows.

In response to the connection request, a unique device identifier of the first terminal, identity information of the anchor user, and characteristic information of the live-stream room are sent to the second terminal according to the pre-protocol information, so that the first live video stream uploaded by the first terminal is sent down to the second terminal.

After the step in which in response to the connection request, the first live video stream uploaded by the first terminal is sent down to the second terminal, before the step in which the third live video stream uploaded by the second terminal and formed by combining at least one of a second live video stream and the first live video stream is received and delivered to the member user in the live-stream room, steps described below are included. A control instruction for collecting the second live video stream is sent to the second terminal to generate, on a user interface of the second terminal, a control window for collecting the second live video stream.

After the connection request is received and when a confirmation instruction from the first terminal is received, the subsequent steps are continued.

Meanwhile, another method for controlling delivery of a video stream of a live-stream room includes the steps described below.

Pre-protocol information outputted by a second terminal is obtained, and a connection request including the pre-protocol information is initiated by using an anchor user identity to a server.

A first live video stream generated locally is uploaded to the server in response to a confirmation instruction of an anchor user.

In the another method for controlling delivery of a video stream of a live-stream room, the following technical content is further included.

The pre-protocol information is represented in a form of a QR code, and is obtained through scanning the QR code with a camera.

After the connection request is initiated by using the anchor user identity to the server, and before the confirmation instruction of the anchor user is responded to, an operation interface for confirming a connection is provided to upload the first live video stream generated locally to the server after the confirmation instruction of the anchor user is received.

The another method for controlling delivery of a video stream of a live-stream room further includes subsequent steps. A control instruction for collecting a second live video stream is sent to the second terminal through the server to generate, on a user interface of the second terminal, a control window for collecting the second live video stream.

Meanwhile, a third method for controlling delivery of a video stream of a live-stream room includes the steps described below.

A link identifier representing pre-protocol information is outputted.

A first live video stream down sent by a server is received in response to a connection request initiated by a first terminal to the server and including the pre-protocol information.

A second live video stream in the second terminal is collected, at least one of the first live video stream and the second live video stream is combined into a third live video stream, and the third live video stream is uploaded to the server so that the server delivers the third live video stream to at least one user in a live-stream room.

In the third method for controlling delivery of a video stream of a live-stream room, the following technical content is further included.

Processes of receiving the first live video stream, collecting the second live video stream, combining the first live video stream and the second live video stream into the third live video stream, and uploading the third live video stream are performed in parallel.

An apparatus for controlling delivery of a video stream of a live-stream room includes a request reception module, a request response module and a video delivery module.

The request reception module is configured to receive a connection request initiated by an anchor user of the live-stream room from a first terminal and including pre-protocol information outputted by a second terminal.

The request response module is configured to respond to the connection request and send a first live video stream uploaded by the first terminal down to the second terminal.

The video delivery module is configured to receive a third live video stream uploaded by the second terminal and formed by combining at least one of a second live video stream and the first live video stream, and deliver the third live video stream to a member user in the live-stream room.

An apparatus for controlling delivery of a video stream of a live-stream room includes an obtaining module and a sending module.

The obtaining module is configured to obtain pre-protocol information outputted by a second terminal, and initiate, with an anchor user identity, a connection request including the pre-protocol information to a server.

The sending module is configured to respond to a confirmation instruction of an anchor user, and upload a first live video stream generated locally to the server.

An apparatus for controlling delivery of a video stream of a live-stream room includes an output module, a reception module and a combination module.

The output module is configured to output a link identifier representing pre-protocol information.

The reception module is configured to receive a first live video stream down sent by a server in response to a connection request initiated by a first terminal to the server and including the pre-protocol information.

The combination module is configured to collect a local second live video stream, combine at least one of the first live video stream and the second live video stream into a third live video stream, and upload the third live video stream to the server so that the server delivers the third live video stream to at least one user in a live-stream room.

A server includes a processor. The processor is configured to execute the first method for controlling delivery of a video stream of a live-stream room.

A mobile terminal includes a processor, a memory, a touch-sensitive display, and a camera. The processor is configured to execute any one of the first and the second methods for controlling delivery of a video stream of a live-stream room.

In the present disclosure, in consideration of the live-stream content of the live-stream room including the video stream, the audio stream, barrage information, gift information, etc. and based on the separation and combination technologies of the live video stream, the live video streams of different terminals are combined through the anchor user terminal and uploaded to the server, and then the server delivers the combined video stream to each viewing user in the live-stream room, reducing the pressure on the server to combine too many video streams and saving resources. In the meantime, the present disclosure uses the mobile terminal as the quick login and authentication entry for the anchor to perform live-streaming. In such a manner, quick and automatic live-streaming on the PC terminal is supported without adding a third-party peripheral. The threshold of starting live-streaming of multi-end video streams is greatly lowered, and a quicker and more flexible multi-platform live-streaming process is achieved. In addition, in the present disclosure, based on the account-separation system of the mobile terminal and the PC terminal, the higher-performance image processing capability of the PC terminal in conjunction with the convenience of the mobile terminal to quickly start live-streaming is used for the PC to process, combine and upload the live-stream content to the server. The server then delivers the processed and combined live-stream content to each viewing user in the live-stream room to ensure the time synchronization of the live video stream.

In summary, in the present disclosure, advantages of the respective video live-stream client on the mobile terminal and on the PC terminal are combined, which simplifies operation steps of the multi-platform and multi-view live-streaming and reduces the technical threshold of the multi-platform and multi-view live-streaming, so that the anchor user uses the multi-platform and multi-view simultaneous live-steaming more conveniently and quickly, which improves the efficiency of live-streaming and then improves user experience.

While some exemplary embodiments of the present disclosure have been illustrated, it should be understood by those skilled in the art that changes to the exemplary embodiments may be made without departing from the principle or spirit of the present disclosure. The scope of the present disclosure is determined by the appended claims and equivalents thereof.

What is claimed is:

1. A method for controlling delivery of a video stream of a live-stream room, comprising:
    after an anchor user logs into a live-stream platform account on a first terminal of the anchor user and creates the live-stream room, and logs into the live-stream platform account on a second terminal of the anchor user, receiving, by a server, a connection request initiated by the first terminal of the anchor user of the live-stream room, wherein the connection request comprises pre-protocol information outputted by the second terminal of the anchor user to the first terminal of the anchor user, the pre-protocol information includes a unique device identifier of the second terminal of the anchor user and an authorization token for establishing a dedicated link between the server and the second terminal of the anchor user or authentication information for establishing the dedicated link between the server and the second terminal of the anchor user, and the dedicated link is configured to transmit live video streams between the server and the second terminal of the anchor user;
    checking, by the server, whether the pre-protocol information in the connection request conforms to a rule for pre-protocol information defined by a live-stream platform;
    in response to the pre-protocol information conforming to the rule for the pre-protocol information defined by the live-stream platform, determining, by the server, the connection request as a legal connection request, sending, by the server, a unique device identifier of the first terminal of the anchor user, identity information of the anchor user, and channel identifier of the live-stream room to the second terminal of the anchor user, and establishing, by the server, the dedicated link with the second terminal of the anchor user;
    sending, by the server, a first live video stream uploaded by the first terminal of the anchor user down to the second terminal of the anchor user via the dedicated link; and
    receiving, by the server, a third live video stream uploaded by the second terminal of the anchor user and formed by the second terminal of the anchor user combining a second live video stream and the first live video stream, wherein the second live video stream is collected by the second terminal of the anchor user; and delivering the third live video stream to a terminal of a member user in the live-stream room so that live content in the live-stream room is synchronously displayed on the second terminal of the anchor user and the terminal of the member user.

2. The method of claim 1, wherein after sending, by the server, the first live video stream uploaded by the first terminal of the anchor user down to the second terminal of the anchor user via the dedicated link, and before receiving, by the server, the third live video stream uploaded by the second terminal of the anchor user and formed by the second terminal of the anchor user combining the second live video stream and the first live video stream and delivering the third live video stream to the terminal of the member user in the live-stream room, the method further comprises:
    sending, by the server, a control instruction for collecting the second live video stream to the second terminal of the anchor user to generate, on a user interface of the second terminal of the anchor user, a control window for collecting the second live video stream.

3. The method of claim 1, wherein the first live video stream, the second live video stream, and the third live video stream each comprise an image stream and an audio stream, and the third live video stream comprises the image stream of the first live video stream and the image stream of the second live video stream and further comprises the audio stream of the first live video stream and the audio stream of the second live video stream.

4. A method for controlling delivery of a video stream of a live-stream room, comprising:
    after an anchor user logs into a live-stream platform account on a first terminal of the anchor user and creates the live-stream room, and logs into the live-stream platform account on a second terminal of the anchor user, obtaining, by the first terminal of the anchor user, pre-protocol information outputted by the second terminal of the anchor user to the first terminal of the anchor user, and initiating, by the first terminal of the anchor user, a connection request comprising the pre-protocol information to a server, such that the server checks whether the pre-protocol information in the connection request conforms to a rule for pre-protocol information defined by a live-stream platform, and in response to the pre-protocol information conforming to the rule for the pre-protocol information defined by the live-stream platform, the server determines the connection request as a legal connection request, sends a unique device identifier of the first terminal of the anchor user, identity information of the anchor user, and channel identifier of the live-stream room to the second terminal of the anchor user, and establishes a dedicated link with the second terminal of the anchor user;

wherein the pre-protocol information includes a unique device identifier of the second terminal of the anchor user and an authorization token for establishing the dedicated link between the server and the second terminal of the anchor user or authentication information for establishing the dedicated link between the server and the second terminal of the anchor user, and the dedicated link is configured to transmit live video streams between the server and the second terminal of the anchor user; and uploading, by the first terminal of the anchor user, in response to a confirmation instruction of the anchor user, a first live video stream generated in the first terminal of the anchor user to the server.

5. The method of claim 4, wherein the pre-protocol information is represented in a form of a quick response (QR) code, and is obtained by scanning the QR code with a camera.

6. The method of claim 4, wherein after initiating, by the first terminal of the anchor user, the connection request to the server, and before responding to the confirmation instruction of the anchor user, the first terminal provides an operation interface for confirming a connection to upload the first live video stream generated in the first terminal to the server after receiving the confirmation instruction of the anchor user.

7. The method of claim 4, further comprising:
sending, by the first terminal, a control instruction for collecting a second live video stream through the server to the second terminal to generate, on a user interface of the second terminal, a control window for collecting the second live video stream.

8. A method for controlling delivery of a video stream of a live-stream room, comprising:
after an anchor user logs into a live-stream platform account on a first terminal of the anchor user and creates the live-stream room, and logs into the live-stream platform account on a second terminal of the anchor user, outputting, by the second terminal of the anchor user, a link identifier representing pre-protocol information to the first terminal of the anchor user, such that the first terminal of the anchor user obtains the pre-protocol information according to the link identifier, and initiates a connection request comprising the pre-protocol information to a server to enable the server to check whether the pre-protocol information in the connection request conforms to a rule for pre-protocol information defined by a live-stream platform, wherein the pre-protocol information includes a unique device identifier of the second terminal of the anchor user and an authorization token for establishing a dedicated link between the server and the second terminal of the anchor user or authentication information for establishing the dedicated link between the server and the second terminal of the anchor user, and the dedicated link is configured to transmit live video streams between the server and the second terminal of the anchor user;

in response to the pre-protocol information conforming to the rule for the pre-protocol information defined by the live-stream platform, receiving, by the second terminal of the anchor user from the server, a unique device identifier of the first terminal of the anchor user, identity information of the anchor user, and channel identifier of the live-stream room, such that the dedicated link is established between the server and the second terminal of the anchor user;

receiving, by the second terminal of the anchor user via the dedicated link, a first live video stream down sent by the server; and collecting, by the second terminal of the anchor user, a second live video stream in the second terminal of the anchor user, combining, by the second terminal of the anchor user, the first live video stream and the second live video stream into a third live video stream, and uploading, by the second terminal of the anchor user, the third live video stream to the server so that the server delivers the third live video stream to a terminal of a member user in the live-stream room so that live content in the live-stream room is synchronously displayed on the second terminal of the anchor user and the terminal of the member user.

9. The method of claim 8, wherein processes of the second terminal receiving the first live video stream, collecting the second live video stream, combining the first live video stream and the second live video stream into the third live video stream, and uploading the third live video stream are performed in parallel.

10. A server, which is configured to:
after an anchor user logs into a live-stream platform account on a first terminal of the anchor user and creates a live-stream room, and logs into the live-stream platform account on a second terminal of the anchor user, receive a connection request initiated by the first terminal of the anchor user of the live-stream room, wherein the connection request comprises pre-protocol information outputted by the second terminal of the anchor user to the first terminal of the anchor user, the pre-protocol information includes a unique device identifier of the second terminal of the anchor user and an authorization token for establishing a dedicated link between the server and the second terminal of the anchor user or authentication information for establishing the dedicated link between the server and the second terminal of the anchor user, and the dedicated link is configured to transmit live video streams between the server and the second terminal of the anchor user;

check whether the pre-protocol information in the connection request conforms to a rule for pre-protocol information defined by a live-stream platform;

in response to the pre-protocol information conforming to the rule for the pre-protocol information defined by the live-stream platform, determine the connection request as a legal connection request, send a unique device identifier of the first terminal of the anchor user, identity information of the anchor user, and channel identifier of the live-stream room to the second terminal of the anchor user, and establish the dedicated link with the second terminal of the anchor user;

send a first live video stream uploaded by the first terminal of the anchor user down to the second terminal of the anchor user via the dedicated link; and receive a third live video stream uploaded by the second terminal of the anchor user and formed by the second terminal of the anchor user combining a second live video stream and the first live video stream, wherein the second live video stream is collected by the second terminal of the anchor user; and deliver the third live video stream to a terminal of a member user in the live-stream room so that live content in the live-stream room is synchronously displayed on the second terminal of the anchor user and the terminal of the member user.

11. A mobile terminal, wherein the mobile terminal is a first terminal of an anchor user, and the first terminal of the anchor user is configured to:

after the anchor user logs into a live-stream platform account on the first terminal of the anchor user and creates a live-stream room, and logs into the live-stream platform account on a second terminal of the anchor user, obtain pre-protocol information outputted by the second terminal of the anchor user to the first terminal of the anchor user, and initiate a connection request comprising the pre-protocol information to a server, such that the server checks whether the pre-protocol information in the connection request conforms to a rule for pre-protocol information defined by a live-stream platform, and in response to the pre-protocol information request conforming to the rule for the pre-protocol information defined by the live-stream platform, the server determines the connection request as a legal connection, sends a unique device identifier of the first terminal of the anchor user, identity information of the anchor user, and channel identifier of the live-stream room to the second terminal of the anchor user, and establishes a dedicated link with the second terminal of the anchor user, wherein the pre-protocol information includes a unique device identifier of the second terminal of the anchor user and an authorization token for establishing the dedicated link between the server and the second terminal of the anchor user or authentication information for establishing the dedicated link between the server and the second terminal of the anchor user, and the dedicated link is configured to transmit live video streams between the server and the second terminal of the anchor user; and upload, in response to a confirmation instruction of the anchor user, a first live video stream generated in the first terminal of the anchor user to the server.

12. A mobile terminal, wherein the mobile terminal is a second terminal of an anchor user, and the second terminal of the anchor user is configured to:

after the anchor user logs into a live-stream platform account on a first terminal of the anchor user and creates a live-stream room, and logs into the live-stream platform account on the second terminal of the anchor user, output a link identifier representing pre-protocol information to the first terminal of the anchor user, such that the first terminal of the anchor user obtains the pre-protocol information according to the link identifier, and initiates a connection request comprising the pre-protocol information to a server to enable the server to check whether the pre-protocol information in the connection request conforms to a rule for pre-protocol information defined by a live-stream platform, wherein the pre-protocol information includes a unique device identifier of the second terminal of the anchor user and an authorization token for establishing a dedicated link between the server and the second terminal of the anchor user or authentication information for establishing the dedicated link between the server and the second terminal of the anchor user, and the dedicated link is configured to transmit live video streams between the server and the second terminal of the anchor user;

in response to the pre-protocol information conforming to the rule for the pre-protocol information defined by the live-stream platform, receive from the server a unique device identifier of the first terminal of the anchor user, identity information of the anchor user, and channel identifier of the live-stream room, such that the dedicated link is established between the server and the second terminal of the anchor user;

receive, via the dedicated link, a first live video stream down sent by the server; and collect a second live video stream in the second terminal of the anchor user, combine the first live video stream and the second live video stream into a third live video stream, and upload the third live video stream to the server so that the server delivers the third live video stream to a terminal of a member user in the live-stream room so that live content in the live-stream room is synchronously displayed on the second terminal of the anchor user and the terminal of the member user.

13. A system for controlling delivery of a video stream of a live-stream room, comprising at least two terminals comprising a first terminal of an anchor user and a second terminal of the anchor user, and a server establishing a communication connection with the at least two terminals, wherein after an anchor user logs into a live-stream platform account on a first terminal of the anchor user and creates the live-stream room, and logs into the live-stream platform account on a second terminal of the anchor user, the second terminal of the anchor user outputs a link identifier representing pre-protocol information to the first terminal of the anchor user, wherein the pre-protocol information includes a unique device identifier of the second terminal of the anchor user and an authorization token for establishing a dedicated link between the server and the second terminal of the anchor user or authentication information for establishing the dedicated link between the server and the second terminal of the anchor user, and the dedicated link is configured to transmit live video streams between the server and the second terminal of the anchor user;

the first terminal of the anchor user obtains the pre-protocol information according to the link identifier, initiates a connection request comprising the pre-protocol information to the server and uploads, in response to a confirmation instruction of the anchor user, a first live video stream generated in the first terminal of the anchor user to the server;

the server checks whether the pre-protocol information in the connection request conforms to a rule for pre-protocol information defined by a live-stream platform, in response to the pre-protocol information conforming to the rule for the pre-protocol information defined by the live-stream platform, the server sends a unique device identifier of the first terminal of the anchor user, identity information of the anchor user, and channel identifier of the live-stream room to the second terminal of the anchor user, and the server establishes the dedicated link with the second terminal of the anchor user, and sends the first live video stream uploaded by the first terminal of the anchor user down to the second terminal of the anchor user;

the second terminal of the anchor user receives the first live video stream down sent by the server, combines the first live video stream and a second live video stream collected in the second terminal of the anchor user into a third live video stream and uploads the third live video stream to the server; and the server receives the third live video stream uploaded by the second terminal of the anchor user and delivers the third live video stream to a terminal of a member user in the live-stream room so that live content in the live-stream room is synchronously displayed on the second terminal of the anchor user and the terminal of the member user.

\* \* \* \* \*